July 16, 1935.  M. F. YOUNT  2,008,633
FLUID COOLED BRAKE BAND
Filed Nov. 3, 1932  2 Sheets-Sheet 1
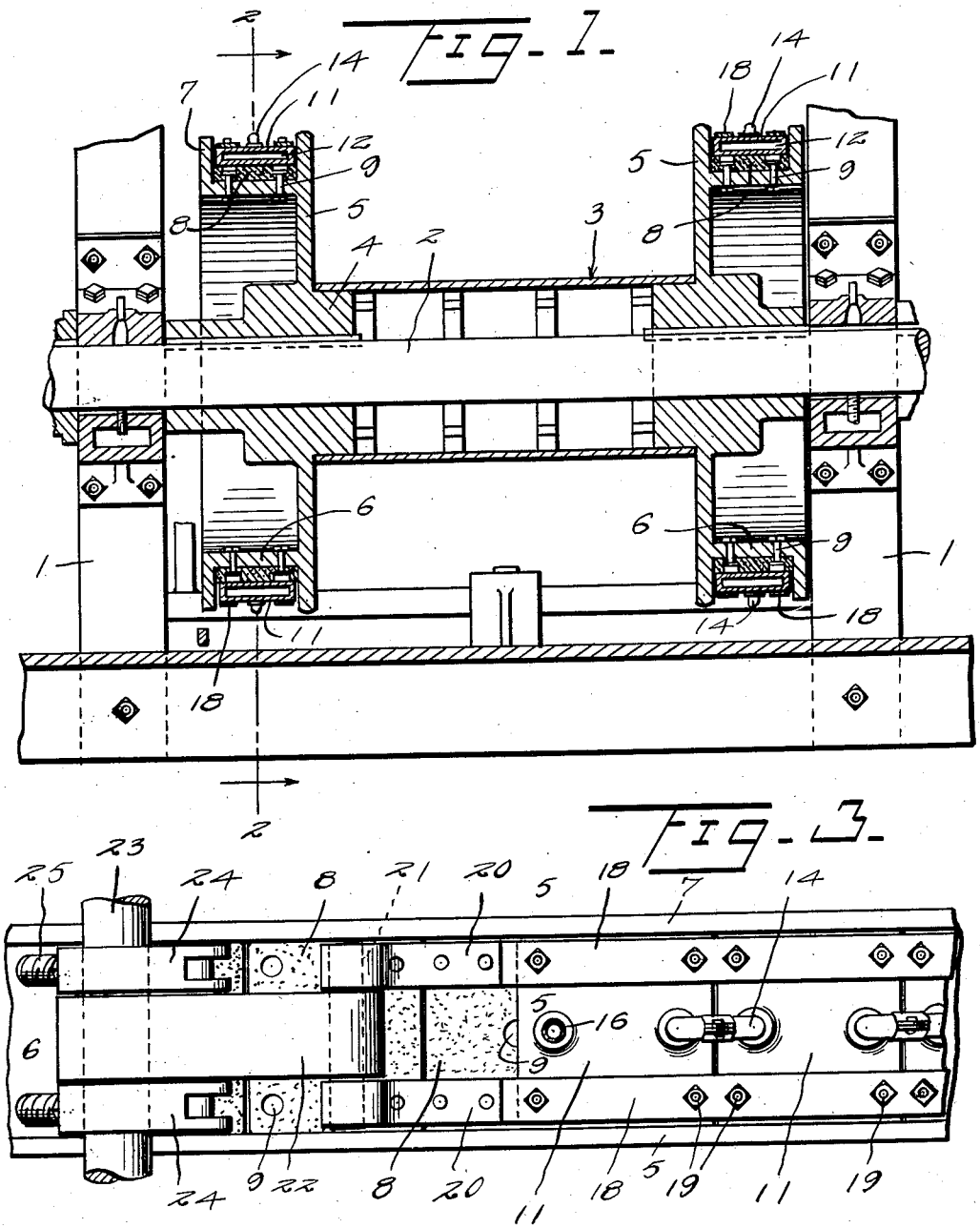

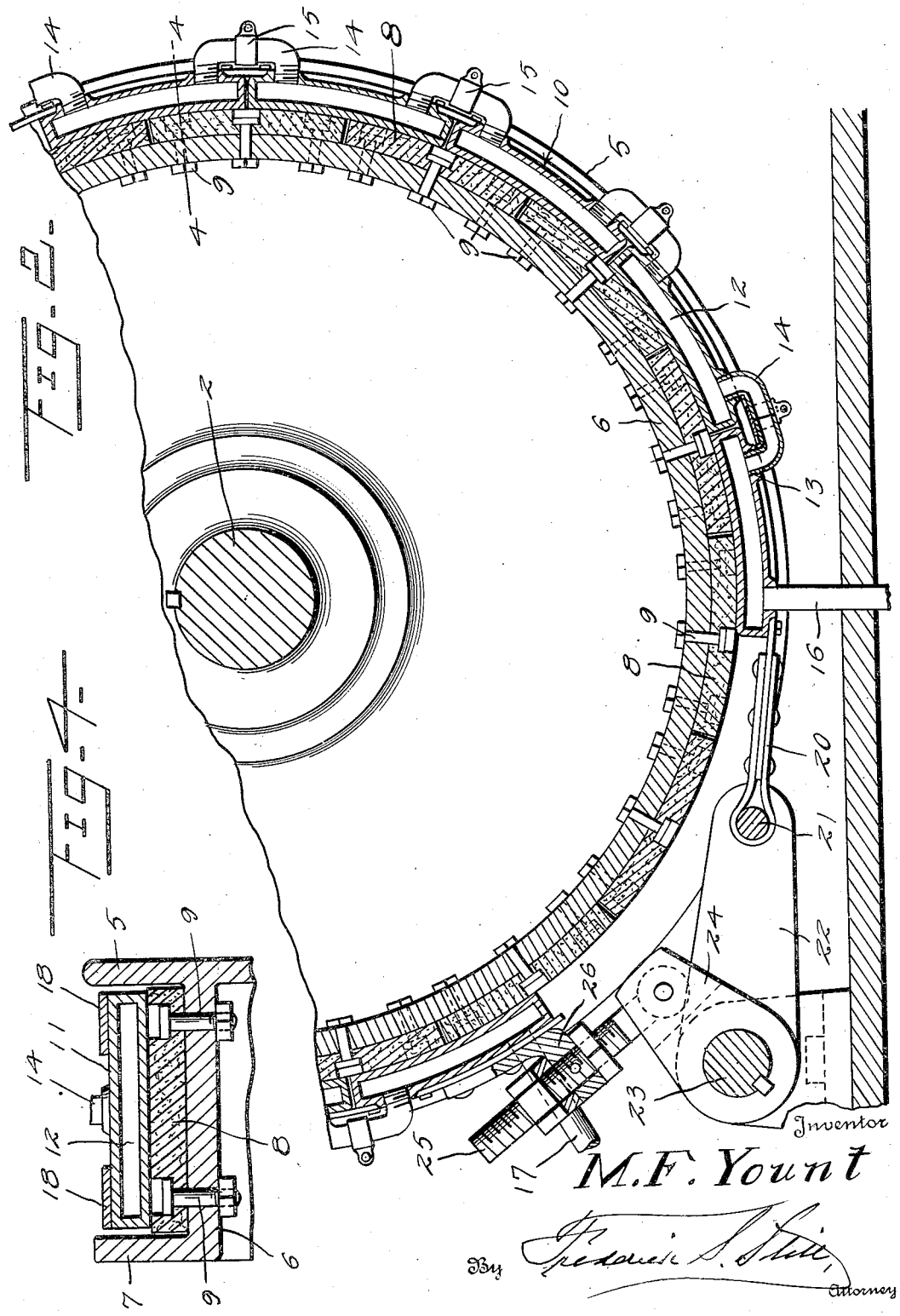

Patented July 16, 1935

2,008,633

UNITED STATES PATENT OFFICE 2,008,633

FLUID COOLED BRAKE BAND

Miles F. Yount, Beaumont, Tex.; Pansy Yount executrix of said Miles F. Yount, deceased Application November 3, 1932, Serial No. 641,057

2 Claims. (Cl. 188—264)

This invention relates to improvements in brake band structures and pertains particularly to an improved fluid cooled brake band.

In the present practice, brake bands employed upon heavy duty machinery such as that used in oil well drilling are frequently cooled by providing a means for circulating cooling fluid through the brake flange. While the cooling action obtained may be satisfactory, this method is unsatisfactory for the reason that the constant expanding and contracting of the brake flange results eventually in the formation of cracks therein which allow the cooling fluid to escape and make it necessary to replace the entire flange. In addition to the waste of time involved in removing the damaged brake flange and mounting a new one in place, the expense involved is an important item.

The primary object of the present invention is to avoid the expense and trouble caused by the use of fluid cooled brake flanges, by the provision of a fluid cooled brake band.

Another important object of the present invention is to provide a fluid cooled brake band which is made up of a plurality of chambered segments which are connected together by flexible tubular elements to permit of a continuous circulation of fluid therethrough and which are individually removable from the unit so that any one may be removed and replaced by a new segment in the event that it becomes damaged, instead of having to discard the entire band as would be the case if the same were made of integral construction.

Still another object of the invention is to provide a fluid cooled brake band, made up of a plurality of connected chambered units, which is freely flexible throughout so that it will conform easily and accurately to the contour of the brake flange upon which it is mounted.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a vertical sectional view through a drum structure at the ends of which brake flanges are formed and upon which flanges are mounted bands constructed in accordance with the present invention.

Figure 2 shows a portion of a brake flange and band constructed in accordance with the present invention, taken in section substantially upon the line 2—2 of Figure 1.

Figure 3 is a view in bottom plan of a portion of the brake band and supporting drum showing the manner of connecting the band segments or blocks together.

Figure 4 is a sectional view taken substantially upon the line 4—4 of Figure 2.

Figure 5 is a sectional view taken through one corner of a block of the brake band showing the manner of connecting the block to a carrying band, the section being substantially upon the line 5—5 of the block and band only as illustrated in Figure 3.

Referring now more particularly to the drawings, wherein like numerals of reference indicate corresponding parts throughout the several views, the numerals 1 indicate portions of a pair of supporting posts forming a part of any base of machinery of the character used in well drilling or other operations where cable drums are employed, and mounted between these posts is a shaft 2 upon which is keyed a cable drum which is indicated as a whole by the numeral 3. This drum, as shown, has the usual end hubs 4 which form the center of an end plate or disk 5 and each of these disks 5 is provided with a brake flange 6, the outer edge of which has a ring 7 integral therewith.

While the brake flange 6 may be covered upon its outer surface with a suitable friction material or left uncovered as desired, it is preferred that it have secured to its outer face the friction blocks 8 which are here illustrated. These friction blocks may be of wood or any other suitable substance and secured to the flange in any suitable manner preferably by means of the bolts 9 which have their heads countersunk in the faces of the blocks, as clearly shown in Figure 2. The provision of the friction blocks 8 or some other suitable friction material prevents the cracking of the metal of the brake flange as a result of the constant heating and cooling to which it is subjected as a result of the frictional action of the brake band thereon.

The improved brake band constituting the present invention is indicated generally by the numeral 10. This band is made up of a plurality of block members 11 which are of slightly less width than the friction blocks 8 and are of slightly arcuate contour longitudinally to conform to the curved surface of the friction block. Each of the brake band blocks 11 is of hollow construction, having the fluid chamber 12 and adjacent each end each has opening through the top thereof a threaded aperture 13.

In the complete band, the chambered blocks 11 are arranged in end to end relation and the adjacent ends of the blocks have engaged in the apertures thereof the tubular elbow fittings 14 which have their free ends in opposed relation and may be connected by the collars or bands 15 or by a flexible hose. These fittings provide continuous fluid passageways between the chambers of the brake band blocks and at one end of the band, the terminal chamber has a fluid inlet pipe 16 while at the other end, the terminal chamber is provided with a fluid outlet pipe 17.

Passing about the chambered blocks 11 over the outer or convex surfaces thereof and adjacent their side edges are the carrying bands 18 which are bolted or otherwise suitably secured to the blocks 11 as indicated at 19 in Figure 5. It is, of course, to be understood that this is only the preferred method of attaching the bands 18 to the blocks 11 as the bands may be connected therewith by the use of tap bolts or screws, if desired.

One end of the brake band 10 has attached thereto the straps 20 which engage a suitable pin 21 carried by an arm 22 which is connected in any suitable manner with a fixed part of the mechanism. This arm 22 may be mounted upon the shaft 23 which is supported adjacent the drum structure or they may be secured in any other suitable manner. The shaft 23 has keyed thereto arms 24 which turn when the shaft is oscillated and exert a pull upon the screw bolts 25 which are connected with the other or movable end of the brake band through the medium of the ears 26. These ears are attached to the said other end of the brake band as shown and in the usual or customary manner, and a further description of this detail is not believed necessary.

It is, of course, understood that the exact manner in which the ends of the brake band are secured and the shiftable end of the band is actuated to tighten it about the drum flange need not be adhered to in the application of the invention as other suitable methods may be devised, therefore, the invention is not to be limited in any respect in connection with the showing and description of this part of the structure.

From the foregoing, it will be readily apparent that a brake band constructed in accordance with the present invention will conform readily to the curvature of the brake flange on which it is mounted due to the flexible band connections 18 which carry and hold in a unit the hollow blocks 11.

It will also be readily apparent that a cooling fluid may be readily circulated about the band to prevent the same becoming heated as a result of frictional engagement between it and the friction blocks 8, and should a leak develop in any one of the blocks 11, this particular one may be removed and replaced with a new one without disturbing the other blocks and at relatively small expense.

With the means herein disclosed for cooling the brake flanges or rims, an advantage is had in the fact that the flange or rim may be made up of very light construction which would cost considerably less than flanges of the character at present in use and would be less trouble to move about.

What is claimed is:—

1. In a brake, a drum having a surface for contact with a band, a split annular brake band surrounding said surface, comprising a plurality of closely disposed chambered blocks each having a face confronting said surface and a pair of bolt openings transversely therethrough adjacent each side, each of said blocks having a pair of fluid openings entering the chamber thereof from the back of the block, a pair of flexible bands connecting the blocks and extending across the backs thereof over said bolt openings, bolts passing through each band into the underlying openings, fluid transfer tubes connecting adjacent ones of said fluid openings of the adjacent blocks, an opening of each end one of the series of blocks constituting a fluid inlet or outlet means, said tubes being entirely free of contact with said bands, and means for coupling the ends of the flexible bands with mechanism for actuating the brake band.

2. In a brake, a drum having a surface for contact by a band, a brake band comprising a plurality of chambered blocks arranged about the drum, each of said blocks having reinforced corners each having a bolt hole therethrough and each block further having a fluid inlet and a fluid outlet opening, the inlet opening of one block and the outlet opening of another block being connected respectively with fluid inlet and outlet pipes, tubular fluid conveying means coupling the other inlet and outlet openings between the blocks to connect the chambers thereof, a resilient band passing over the blocks at each side of the said fluid openings and free from contact with said tubular means, bolts passing through each band and engaging in the block bolt holes, and mechanism connected with the ends of the resilient bands for actuating the brake band.

MILES F. YOUNT.